United States Patent [19]

Yoshida et al.

[11] Patent Number: 5,005,660
[45] Date of Patent: Apr. 9, 1991

[54] PROPULSION AIR STREAM DEFLECTING APPARATUS FOR AIR CUSHION VEHICLE

[75] Inventors: Ryuichi Yoshida, Takarazuka; Takashi Sawada, Suita; Yamamural Tetsushi, Takasago; Koji Kadota, Kobe, all of Japan

[73] Assignee: Kawasaki Jukogyo Kabushiki Kaisha, Hyogo, Japan

[21] Appl. No.: 421,237

[22] Filed: Oct. 16, 1989

[30] Foreign Application Priority Data

Oct. 14, 1988 [JP] Japan .................. 63-133338

[51] Int. Cl.⁵ .............................................. B60V 1/14
[52] U.S. Cl. ..................................... 180/117; 180/123
[58] Field of Search ................ 180/116, 117, 118–120, 180/123

[56] References Cited

U.S. PATENT DOCUMENTS 3,468,394 9/1969 Winter .............................. 180/117
3,532,179 10/1970 McCreary ........................ 180/118
3,799,446 3/1974 Rado .............................. 180/117 X

FOREIGN PATENT DOCUMENTS

52-81815 7/1977 Japan .
0012862 1/1983 Japan .................. 180/117
0208263 8/1989 Japan .................. 180/123

Primary Examiner—Charles A. Marmor
Assistant Examiner—Victor E. Johnson
Attorney, Agent, or Firm—Wenderoth, Lind & Ponack

[57] ABSTRACT

A propulsion air stream deflecting apparatus for an air cushion vehicle having a hull, an air duct mounted on the hull and a propeller fan, includes a plurality of rudders, each mounted on the hull adjacent to the rear open end of the duct for pivotal movement about a vertical axis. The rudders are adapted to close the rear open end of the air duct. A rudder control mechanism is operatively connected to the rudders for controlling the pivotal movement of the rudders to selectively provide a propulsion thrust and a steering thrust to the hull and to provide a closed position in which the rear open end of the air duct is closed by the rudders. A flap is pivotably mounted at the rear end thereof to the duct such that the flap closes an opening, formed at the rear end of the air duct, at a closed position thereof where the inner face of the flap is substantially flush with the inner surface of the air duct. The flap turns outwardly to open the opening due to an increase in pressure in the duct in the closed position of the rudders, for deflecting the air stream, passing out the opening, forwards to provide a forward thrust to the hull for braking, stopping or rearwardly moving the hull. A flap urging spring urges the flap to close the opening.

8 Claims, 7 Drawing Sheets

PROPULSION AIR STREAM DEFLECTING APPARATUS FOR AIR CUSHION VEHICLE

BACKGROUND OF THE INVENTION

The present invention relates to a propulsion air stream deflecting apparatus of an air cushion vehicle (hereinafter referred to as ACV) for controlling the direction of a pressurized air stream, produced by a propeller, that provides a propulsion thrust or a steering thrust to the ACV.

Air cushion vehicles are provided with a pressurized air stream deflecting apparatus using a pair of rudders for producing a propulsion thrust, as disclosed in Japanese Patent (Unexamined) Publication No. 52-81,815 published July 8, 1977. The apparatus has a horizontal cylindrical air duct mounted on the rear part of the vehicle hull and extending in the fore-to-aft direction. A propeller fan is installed in the air duct. The air duct is provided with vertical rudders at the rear end thereof, and the vehicle is steered by turning the rudders to the port or starboard side.

To brake the vehicle moving forward, the rudders are moved to close the rear open end of the air duct. When the air duct is closed at the rear end, a substantially annular air guide installed around the rear end of the air duct operates to receive the air stream and direct it in the reverse direction, that is, forwardly of the vehicle, as will be described hereinafter in more detail. The reverse air stream is, however, produced to some degree, even when the vehicle is advancing, thus decreasing the propulsion thrust. Moreover, the guide broadens the cross-sectional area of the path of the pressurized air through the air duct so that the resistance to the air stream is increased and eddy currents are created to generate noise.

SUMMARY OF THE INVENTION

It is an object of the present invention to provide a propulsion air stream deflecting apparatus for an air cushion vehicle, which apparatus enables the propulsion stream to be deflected for steering the vehicle with a simple structure that does not substantially reduce the propulsion thrust and that generates less noise than the known apparatus.

To achieve this and other objects, the present invention provides a propulsion air stream deflecting apparatus for an air cushion vehicle including a hull. The propulsion air stream deflecting apparatus includes: an air duct mounted on the hull and including a propeller fan installed therein to produce a propulsion air stream in the air duct for providing a rearward thrust to the hull, the air duct having an opening means formed therethrough downstream of the propeller fan; a plurality of rudders, each mounted on the hull adjacent to the rear open end of the duct for pivotal movement about a vertical axis, the rudders being adapted to assume propelling thrust producing positions and a closed position to close the rear open end of the air duct; rudder control means, operatively connected to the rudders, for controlling the pivotal movement of the rudders to cause the rudders to selectively take one of said positions to provide a propulsion thrust and a steering thrust to the hull or to close the rear open end of the air duct to cause an increase in air pressure in the air duct; flap means pivotably mounted at a rear end thereof to the duct such that the flap means closes the opening means at its normal position where the inner face thereof is substantially flush with the inner surface of the air duct, said flap means being swingable outwardly into an open position in which the inner face of the flap means extends obliquely forwards to open the opening means; and flap urging means for urging the flap means to close the opening means, the flap urging means being formed to allow the flap means to move to its open position due to the air pressure increase in the air duct in the closed position of the rudders, the inner face of the flap means in the open position guiding the air in the air duct to cause it to flow forwards to provide a rearward thrust to the hull for braking, stopping or rearwardly moving the vehicle.

The present invention will now be described in detail by way of examples with reference to the accompanying drawings.

DETAILED DESCRIPTION OF THE PREFERRED EMBODIMENTS

Prior to the description of the preferred embodiments of the invention, the known air stream deflecting apparatus discussed before will be described briefly below for a better understanding of the background art and disadvantages thereof.

FIGS. 10-13 illustrate a typical example of known small-sized hovercraft having a lift fan and a propeller fan. The hovercraft is provided with a pressurized air stream deflecting apparatus using a pair of rudders for producing a propulsion thrust. Such a hovercraft is disclosed in Japanese Patent (unexamined) Publication No. 52-81815 published July 8, 1977.

Figure 10:
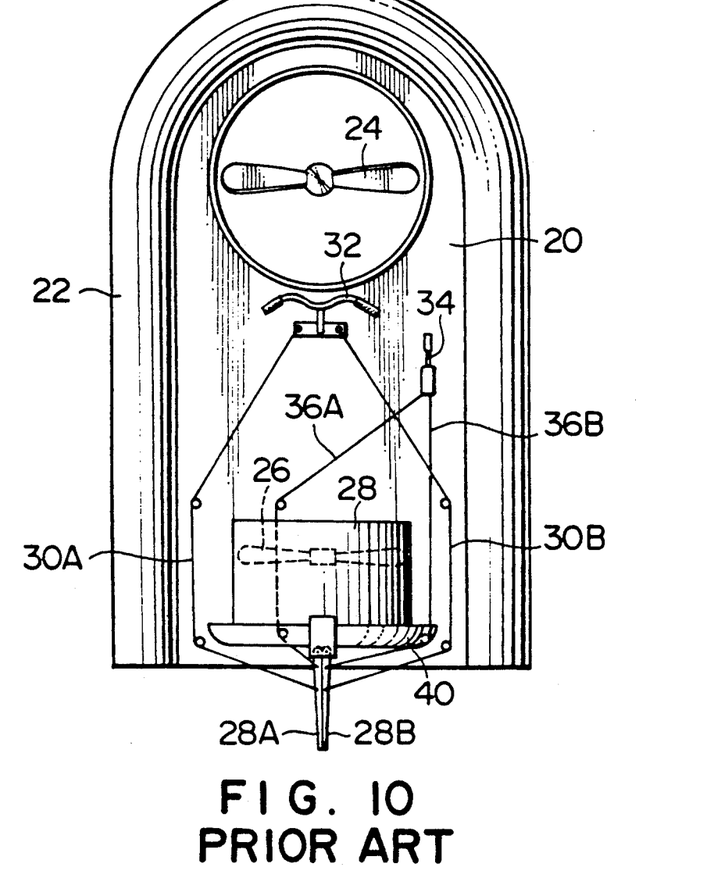
FIG. 10 is a schematic plan view of a known hovercraft.
Figure 11:
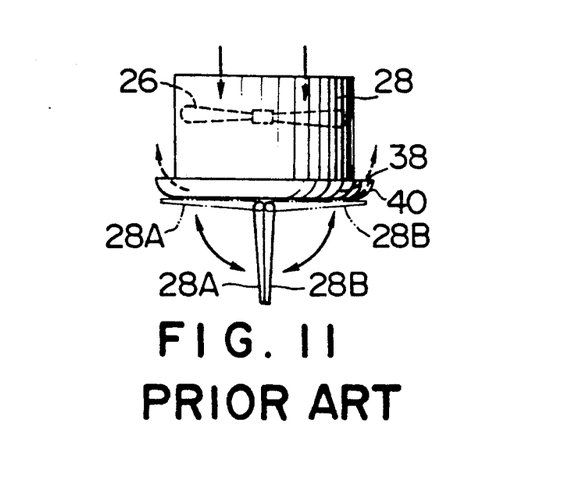
FIG. 11 is a plan view of the air duct shown in FIG. 10.
Figure 12:
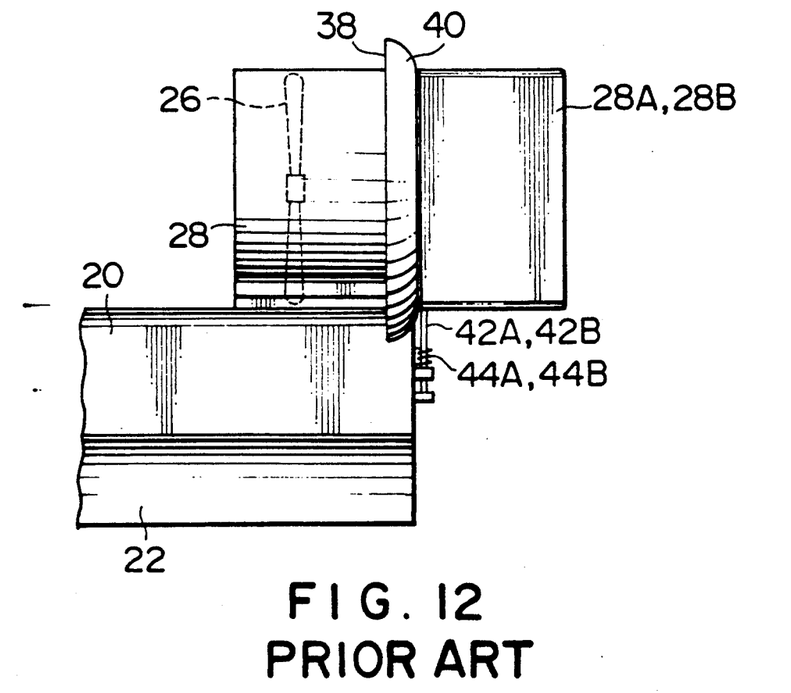
FIG. 12 is an enlarged fragmental side view of the hovercraft of FIG. 10.
Figure 13:
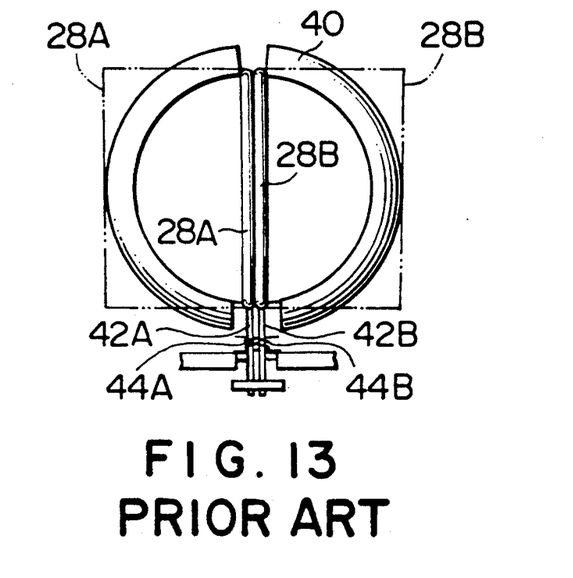
FIG. 13 is a rear view of the air duct in FIG. 12.

In FIGS. 10 and 12, reference numeral 20 designates the hull of the hovercraft, having a skirt 22, a lift fan 24 and a propeller fan 26, which is mounted within a horizontal cylindrical duct 28 at the rear of the hull 20. A pair of rudders 28A and 28B which are mounted to the hull immediately behind the duct 28 for rotation about vertical axes are steered by a steering handle 32 via cables 30A and 30B. A brake lever 34 is mounted near the steering handle 32 and is also connected via cables 36A and 36B to the rudders 28A and 28B for causing the rudders to pivot to open and close the rear end of the duct 28. An air stream guide 40, which includes a pair of semicircular flange members as shown in FIG. 13, defines air flow path for directing pressurized air, produced by the propeller fan 26, forward when the duct 28 is closed by the rudders 28A, 28B. Each of the rudders 28A and 28B is normally kept in the position, shown by the solid line in FIG. 11, by a spring 44A or 44B mounted around a mounting shaft 42A or 42B therefor.

When the steering handle 32 is turned to the right or left, the rudders 28A and 28B are angularly moved for turning the hull in the corresponding direction. For braking the vehicle, the brake lever 34 is manipulated to pivot the rudders 28A and 28B by way of the cables 36A and 36B through an angle of 90° in opposite directions, thereby closing the rear opening of the duct 28 as illustrated by the dots-and-dash lines in FIG. 11. Thus, the propulsion air stream produced by the propeller fan 26 impinges upon the closed rudders and it is then guided by the guide member 40 to flow forward along the flow path, so that a forward propulsion thrust is provided to the hull for stopping it quickly. Release of the brake lever allows the rudders to return to their respective original positions by both the restoring force of the springs and the backward flow of the pressurized air for restarting forward travel of the vehicle.

Although the known ACV is capable of applying a braking force to the hull or moving it backwards without stopping the engine, it has the following drawbacks. First, is open forward, the guide 40 which opens forwards causes part of the pressurized air from the propeller fan 26 to flow forward so that there occurs a decrease in the propulsion thrust to the hull and hence in the speed and acceleration thereof. Second, the path of the pressurized air through the duct 28 is broadened at the guide 40. Thus, the flow resistance against the pressurized air is increased at the guide, resulting in a considerable drop in the propulsion thrust to the hull. Last, an eddy current is created in the wide path at the guide to therefore generate noise.

Figure 1A:
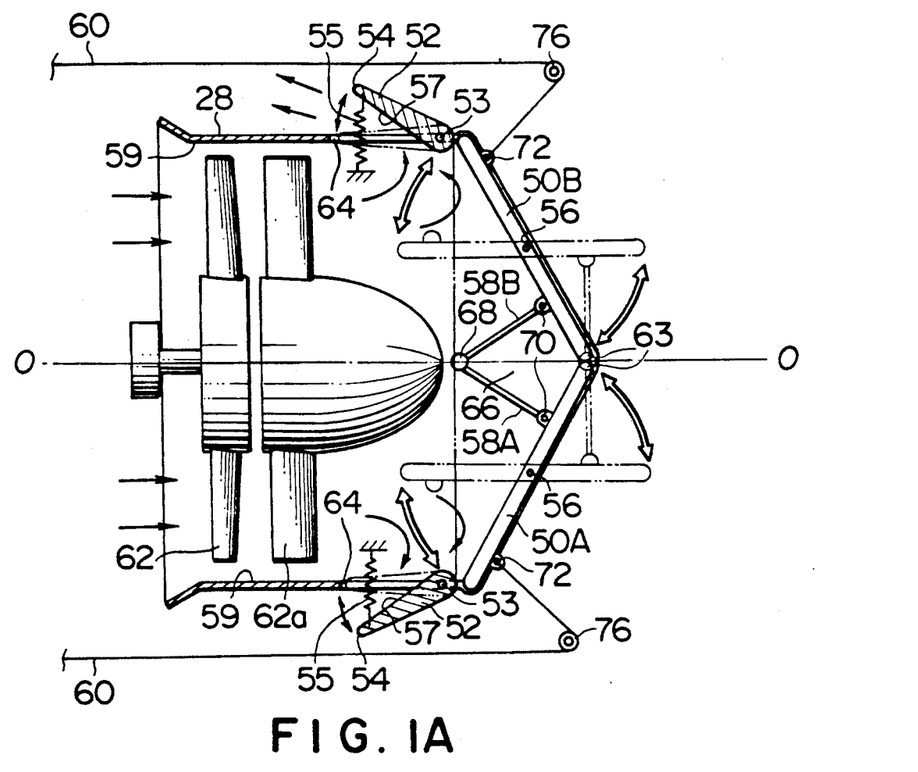
FIG. 1A is a horizontal longitudinal cross-sectional view of an air duct with rudders of a propulsion air stream deflecting apparatus according to the present invention.
Figure 1B:
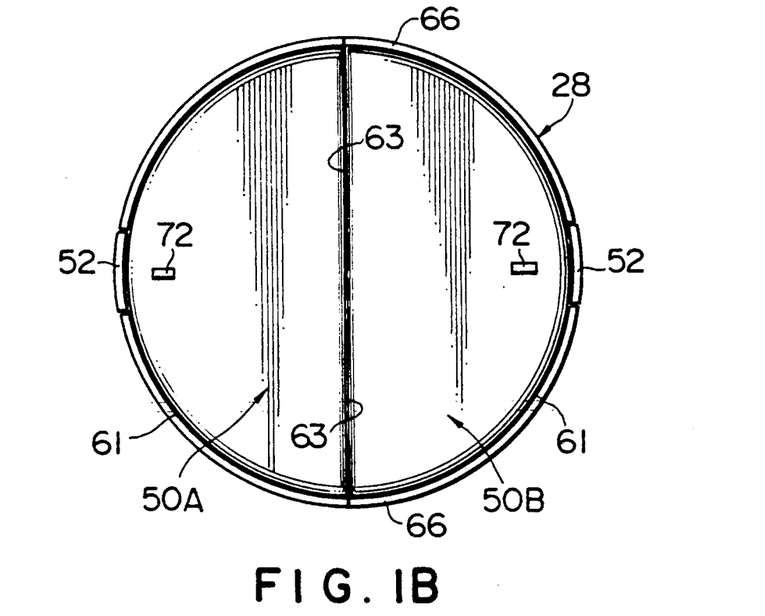
FIG. 1B is a rear view of the air duct with rudders of FIG. 1A.

Referring now to FIGS. 1A and 1B, reference numeral 28 designates a hollow cylindrical air duct, within which a propeller fan 62 and stationary blades 62a are coaxially arranged in a conventional manner. A pair of arcuate side flap members 52 are horizontally pivotable about respective pivots 53 at the rear end of the air duct 28. The flap members 52 are shaped to fit in respective side recesses 64 in the air duct, with their free or distal ends 54 directed forwards, the recesses being formed in the rear end portion of the duct in a horizontally opposed manner. Each of the flap members 52 is urged by a coil spring 55 towards the circumferential wall of the air duct 28 so that it is placed in the normal position shown by dots-and-dash line in FIG. 1A, with its radial inner face 57 being substantially flush with the inner surface, 59 of the air duct.

A pair of substantially semicircular rudder members 50A and 50B are pivotable about respective vertical pivots 56 mounted to a pair of lugs 66 which projects rearward in an opposed manner from the rear end 62 of the air duct 28. The pivots 56 are located symmetrically with respect to the axis of the air duct 28. As shown in FIG. 1B, each rudder member 50A or 50B has an arcuate edge 61 and a chord edge 63 contiguous to the arcuate edge, the chord edge 63 being parallel with the vertical pivot 56. The rudder members 50A and 50B are connected via a link mechanism including a pair of links 58A and 58B. These links 58A and 58B are pivotally connected at respective first ends thereof to each other and at respective second ends thereof to the associated rudders 50A and 50B at positions 70 on the inner faces thereof between the pivot axes 56 and the chord edges 61 thereof. The connected links 58A and 58B have an overall length slightly smaller than the distance between the pivot pins 56 when they are extended, as shown by the phantom line in FIG. 1A, for placing the rudders 50A and 50B in positions parallel with each other.

Figure 2:
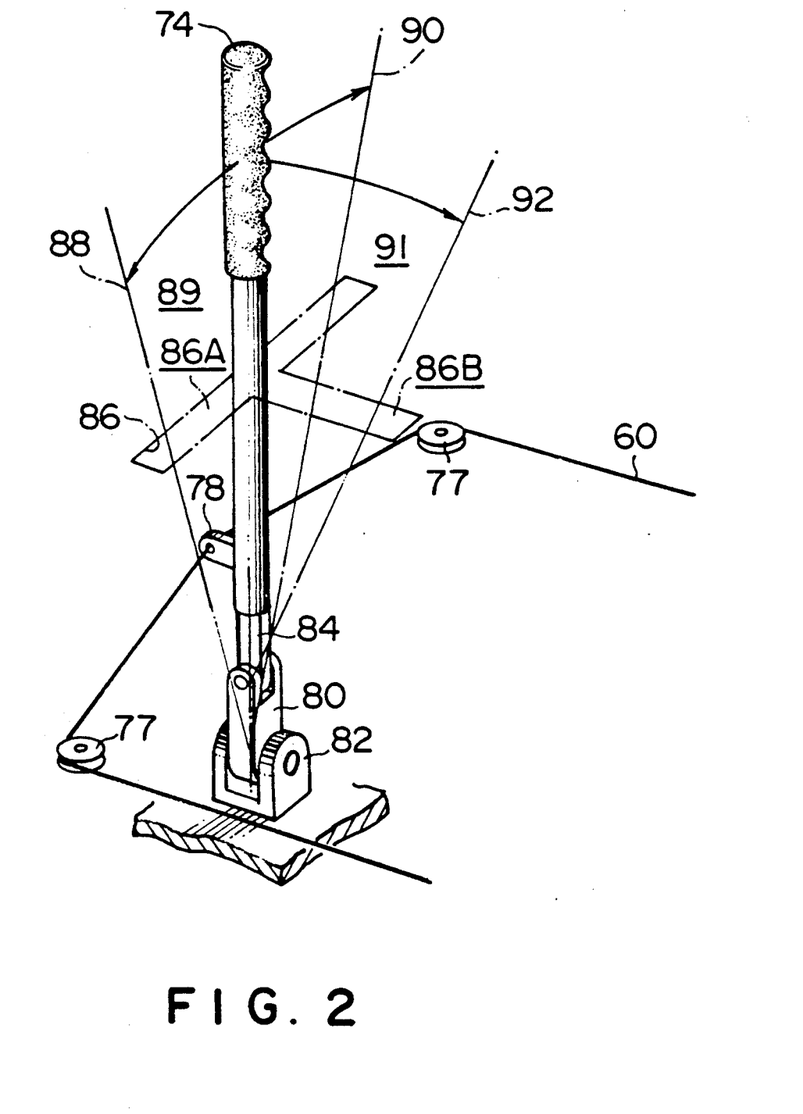
FIG. 2 is a diagrammatic illustration of a control lever used in the present invention.
Figure 3:
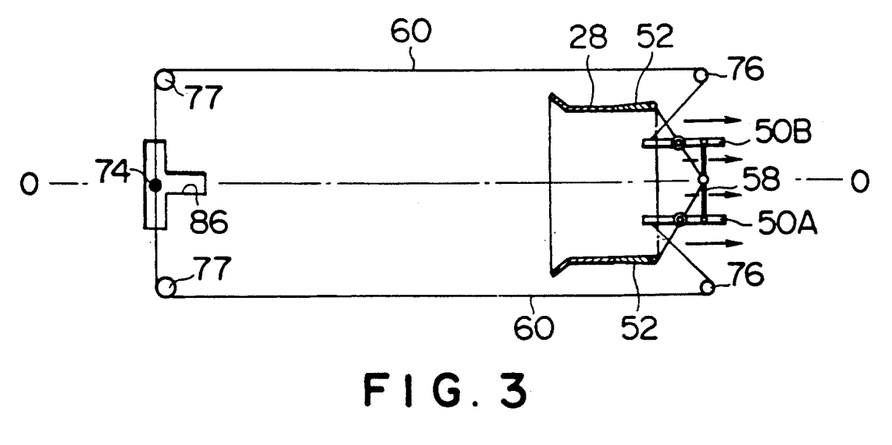
FIG. 3 is a diagrammatic plan view, on a reduced scale, of the propulsion air stream deflecting apparatus of the present invention, using the air duct in FIG. 1A and the control lever in FIG. 2, the view showing a state in which the ACV is moved forwards.
Figure 4:
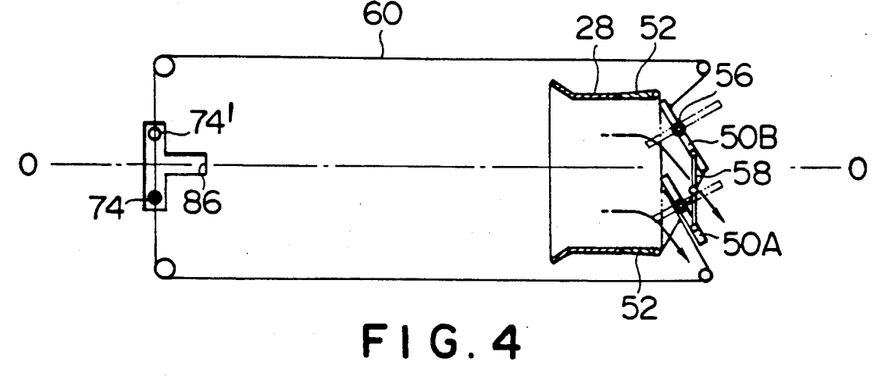
FIG. 4 is a diagrammatic illustration of the propulsion air stream deflecting apparatus, showing a state in which the ACV will turn to the port side.
Figure 5:
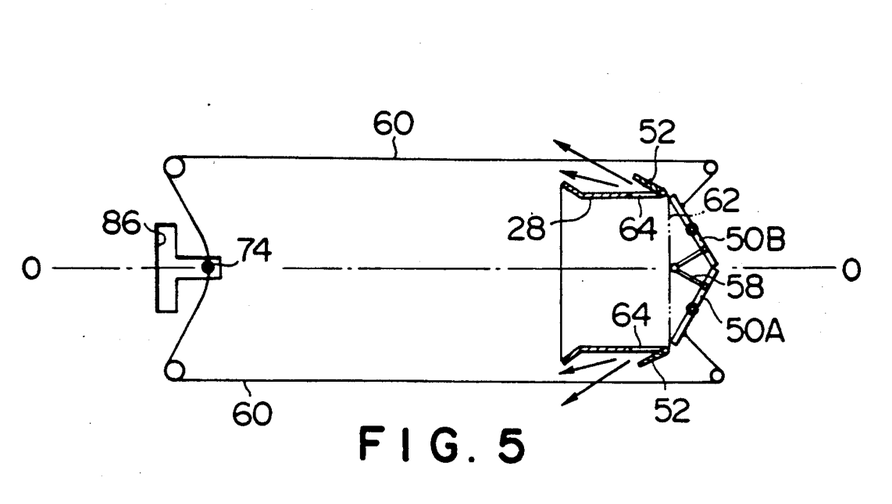
FIG. 5 is a diagrammatic view of the propulsion air stream deflecting, showing a state in which the ACV is moving rearwards.

Each rudder 50A and 50B is connected, at a position 72 on its outer face, to a lug 78 (FIG. 2) of a control lever 74 via a steering cable 60 which passes over guide rollers 76 and 77 as illustrated in FIGS. 3 to 5. The control lever 74 has a lower end portion 84 of reduced diameter pivoted to a wrist member 80 for allowing angular movement in a first vertical plane 91. The wrist member 80 is jointed to a bracket 82, mounted on the hull, for allowing pivotal movement in a second vertical plane 89 perpendicular to the first vertical plane 89. The control lever 74 passes through a T-shaped guide slot 86 formed through a control panel not shown. The T-shaped guide slot 86 is formed such that when the control lever 74 is guided in a transverse portion 86A of the slot 86, it moves in the second vertical plane 89, and such that when the control lever 74 is moved along a portion 86B of the slot 86 extending in a fore-to-aft direction, it is angularly moved in the first vertical plane 91.

In operation, the control lever 74 is normally placed at a neutral position shown in FIG. 2, that is, a position corresponding to the joint portion of the two portions 86A and 86B of the T-shaped slot 86, as shown in FIG. 3, for driving the ACV forwards. With the control lever 74 at the neutral position, the rudders 50A and 50B are placed parallel to the axis 0—0 of the duct 28 or the axis of the hull under a constraining force of a spring not shown, so that the air stream, produced by the propelling fan 62, is allowed to flow backwards without any substantial resistance from the rudders thereby imparting forward movement to the ACV. In this case, the flaps 52 are maintained at the normal positions shown in FIG. 3, since they are urged to the positions by the springs 55 against the small pressure difference between the inside and outside of the air duct 28. Thus, the inner faces of the flaps 52 are flush with the inner surface of the air duct 28, whereby the pressurized air smoothly flows past the flaps 52 without flow resistance.

The condition of the parts of the air stream deflecting apparatus in the case of turning the ACV to the port side is illustrated in FIG. 4. In this case, the control lever 74 is moved towards the port side as indicated by the solid circle, in the transverse portion 86A of the T-shaped slot 86. As a consequence, the starboard-side rudder 50B is pulled via the cable 60, so that it is turned about its pivot 56 in a clockwise direction as viewed in FIG. 4. The port-side rudder 50A which is connected to the starboard-side rudder 50B through the link mechanism 58A and 58B is turned together in the same direction, maintaining a parallel position with the starboard-side rudder 50B. In this condition, the propelling pressurized propulsion air stream is deflected by the rudders 50A and 50B so as to flow towards the port-side of the ACV for turning the latter to the port side. Thus, the ACV may achieve a rapid turn to the port side by maintaining such an arrangement of the rudders 50A and 50B.

For turning the ACV to the starboard side, the control lever 74 is moved to a starboard-side position 74' indicated by a circle in FIG. 4. In this case, the rudders 50A and 50B are placed at the positions indicated by dots-and-dash lines therein.

To drive the ACV in the backwards direction, the control lever 74 is pulled backwards along the fore-to-aft portion 86B of the slot 86 to a backward position shown in FIG. 5. In this case, the rudders 50A and 50B are pulled by the respective cables 60 to rotate about their pivots 56 to positions shown in FIG. 5 where they come into contact with each other at their chord edges 63 projecting backwards, with their arcuate edges 61 disposed closely adjacent to the proximal ends of the respective flaps 52. In this state, the rudders 50A and 50B are arranged symmetrically with respect to the axis 0—0 of the air duct 28. The rear end 62 of the duct 28 is thus closed by the rudders 50A and 50B, so that the pressure in the air duct 28 downstream of the propelling fan 62 is raised. This results in a pressure difference between the inside and outside of the flaps 52 causing the flaps to turn horizontally outwards against the force of the springs 55 as shown by the solid line in FIG. 5. As a result, the pressurized air in the internal space of the air duct 28 downstream of the propeller fan 62 flows horizontally, obliquely forwards through the openings 64 of the air duct to provide a forward thrust to the ACV. By applying this operation to the ACV which is advancing, the ACV is decelerated and then stopped. If this condition is maintained, the ACV may commence rearward movement.

Figure 6:
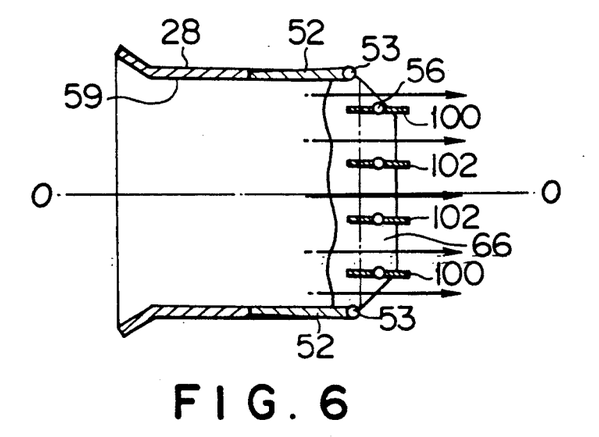
FIG. 6 is a horizontal longitudinal cross-sectional view of a modified form of the air duct of FIG. 1A, showing a state in which a rearward thrust is imparted to the ACV.
Figure 7:
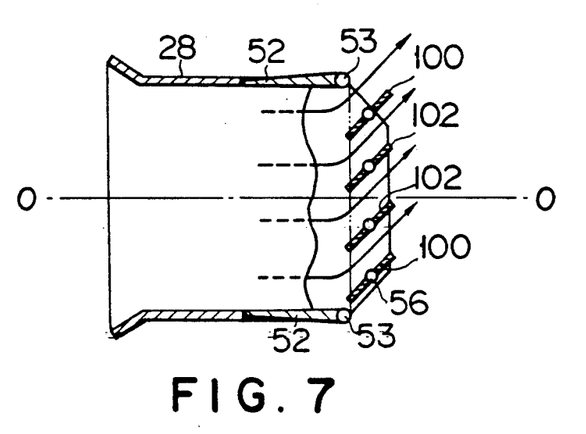
FIG. 7 is a horizontal longitudinal cross-sectional view of the modified air duct, showing a state in which a sideward thrust is imparted to the ACV.
Figure 8:
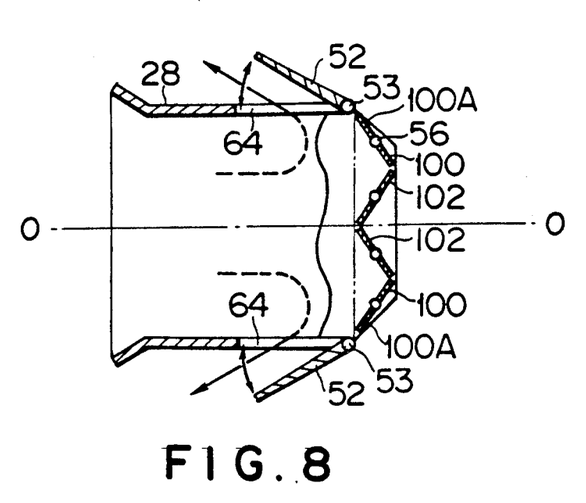
FIG. 8 is a horizontal longitudinal cross-sectional view of the modified air duct, showing a state in which a forward thrust is imparted to the ACV.

As shown in FIGS. 6-8, the propulsion air stream deflecting apparatus may be provided with four rudders 100, 100, 102, 102 instead of two. Each adjacent pair of rudders are connected by link mechanisms such as those 58A and 58B shown in FIG. 5 although the link mechanisms are not shown in FIGS. 6-8 for convenience of illustration. The rudders 100-102, and the flaps 52 are operated in a fashion similar to that described in connection with the embodiment of FIG. 1. In FIG. 6, the rudders 100-102 are directed parallel with the axis 0—0 of the hull and the pressurized air from the propeller fan 62 (not shown) is forced past the rudders 100 and 102 without impinging upon the latter and flows backwards, so that a propulsion thrust is provided to the ACV. In this case, the flaps 52 are held by the springs 55 (also not shown) such that the inner faces thereof are flush with the inner circumferential surface 59 of the air duct 28 without providing any influence on the air stream, since the difference in pressure between the inside and outside of each flap 52 is small when compared to the restoring force of the spring.

FIG. 7 illustrates how to accomplish a turn of the ACV to the starboard side. The rudders 100 and 102 are turned to the starboard side in a manner similar to that described in connection with FIG. 4. This causes the propulsion air stream to flow towards the starboard-side of the ACV to provide an obliquely leftward thrust to the rear of the ACV, turning the ACV to the starboard side. Keeping this state causes a rapid right turn of the ACV.

FIG. 8 shows how to brake the ACV or move it backwards, in which case the two outer port-side and starboard-side rudders 100 are turned such that their arcuate edges 100A come into contact with or are placed adjacent to the rear edge of the air duct 28, while the side edges of the two intermediate rudders 102 are brought into contact with the respective edges of the adjacent two outer rudders as shown. With this arrangement, the rear end of the air duct 28 is closed by the rudders 100 and 102 and by the flaps 52, and hence the pressure of the air in the air duct 28 downstream of the propeller fan 62 is raised. As the force, pivots the flaps 52 outwardly due to the pressure difference between the inside and outside thereof becomes larger than the force from the springs, the flaps 52 are opened as shown to allow the air stream to flow through the recesses 64 of the air duct 28, and the air stream is deflected by each flap 52 obliquely forwards as shown. This brakes the ACV moving forwards to decelerate or stop it. After stopping, the ACV may be moved backwards by maintaining this condition.

The ACV may be provided with more than four rudders. Even when more than four rudders are used, they may be controlled by a single control lever as in the embodiment of FIGS. 6-8. Alternatively, the ACV may have a plurality of control levers, each operating some of the rudders.

Figure 9:
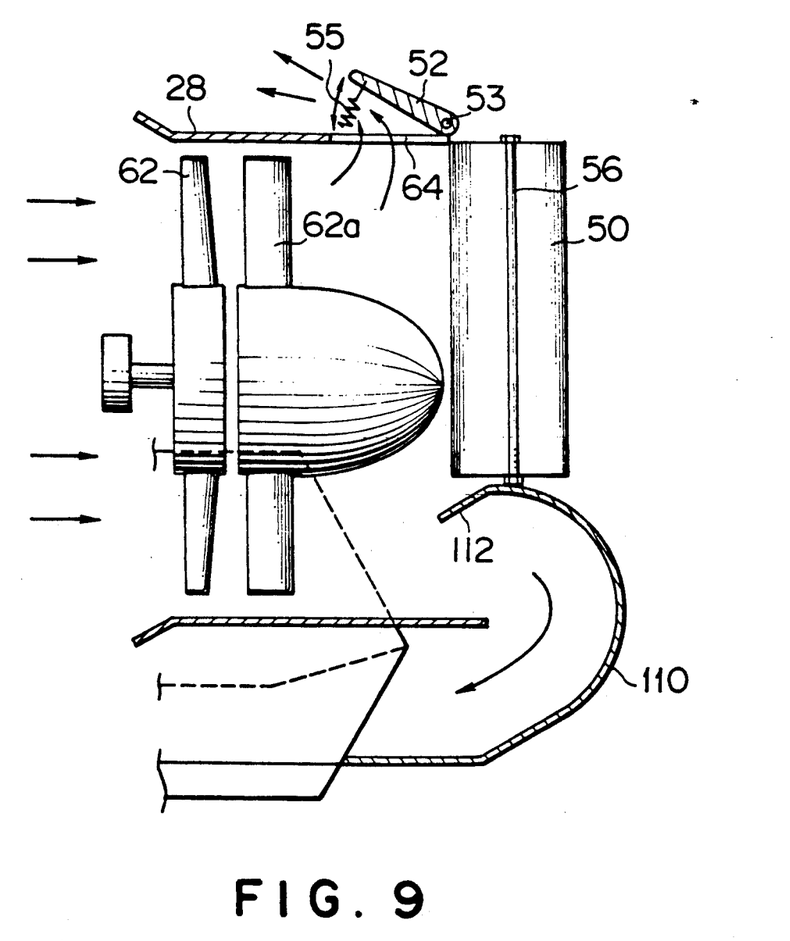
FIG. 9 is a vertical longitudinal cross-sectional view of another form of the air duct usable in the present invention, with a curved or bent duct for additionally providing a lift thrust to the ACV.

Another embodiment of the present invention is illustrated in FIG. 9, in which the propulsion air stream deflecting apparatus has a duct 110 curved in a U-shaped fashion and, mounted at the bottom of the air duct 28, for supplying additional lift air. The apparatus includes a flap 52 provided at a top portion of the rear end of the air duct 28 so as to fit within a recess 64 formed therein. The curved duct 110 extends below the air duct 28 and has a curved inlet edge 112 extending forward into the rear end portion of the air duct 28. A pair of rudders 50, only one of which is shown, are pivotally supported at the lower ends thereof on the rear end of the curved duct 110 and at the upper end thereof by the wall of the air duct 28. The pivot for the rudder is shown by numeral 56. By pulling the control lever 74 (also not shown) backwards, the rear end of the air duct 28 is closed by the rudders 50 together with the flap 52 in a manner similar to that described in connection with the embodiment in FIG. 5, so that part of the air stream is forced to flow into the curved duct 110 to provide an auxiliary lifting air stream. The rest of the air stream is caused to flow out through the recess 64 of the air duct in a forward direction as the flap 52 is turned upwards by the force produced due to the difference in pressure between the inside and outside of the flap 52 and acting against the force of the spring 55. With this operation, the ACV may be slowed, stopped or moved backwards as in the embodiment in FIGS. 1 and 2. Also, the ACV may be propelled or moved sidewards in such a fashion as in the preceding embodiments.

What is claimed is:

1. A propulsion air stream deflecting apparatus for an air cushion vehicle having a hull, said apparatus comprising:

(a) an air duct mounted on the hull, and a propeller fan disposed within said air duct for producing a propulsion air stream in the air duct that provides a thrust to the hull, the air duct having a longitudinal axis, an inner surface extending about the longitudinal axis, a rear open end, and opening means extending therethrough downstream of said propeller fan with respect to the direction in which the air stream produced by said fan flows through the air duct;

(b) a plurality of rudders each having side edges, said rudders supported in the apparatus adjacent the rear open end of said air duct and pivotable about respective vertical axes which lie in a plane extending transversely to the longitudinal axis of said air duct;

(c) link means linking adjacent rudders, of each respective pair thereof, together and articulatable between an extended state and a folded state, said rudders assuming a mutually parallel arrangement when said link means assumes said extended state, and said rudders assuming a closed arrangement in which the side edges of the rudders are in abutting contact with each other and with said air duct at the rear open end thereof thereby closing said rear open end when said link means assumes said folded state;

(d) a control lever pivotally supported on the hull so as to be movable between a neutral position, side positions spaced transversely of the neutral position towards port and starboard sides of the vehicle, respectively, and a rear position spaced from the neutral position toward the rear of the vehicle;

(e) a pair of cables operatively connecting the control lever to said rudders, at respective locations close to the air duct with respect to the transverse dimension of the air duct, in such a manner that when the control lever is in said neutral position, said cables cause the rudders to assume said mutually parallel arrangement in which the rudders extend parallel to the longitudinal axis of the air duct with said link means in the extended state whereby a rearward propulsion thrust is produced by said fan, that when the control lever is in either of said side positions, said cables cause the rudders to assume the mutually parallel arrangement in which the rudders extend at an angle, corresponding to the degree to which control lever is shifted transversely of said neutral position, to the longitudinal axis of the air duct with said link means in the extended state whereby a rearward steering thrust is produced by said fan, and that when the control lever is in said rear position, said cables cause the rudders to assume said closed arrangement with said link means in the folded state whereby the rear open end of the air duct is closed to cause an increase in air pressure in the air duct;

(f) flap means having an inner face and a rear end, the flap means being pivotally mounted at the rear end thereof to said air duct, said flap means assuming a normal position in which the inner face thereof is substantially flush with the inner surface of said air duct to close the opening means thereof, and said flap means being swingable outwardly of said air duct into an open position in which the inner face of the flap means extends obliquely and forwardly in the vehicle, from said rear end thereof, thereby opening said opening means whereby the inner face of the flap means guides the air stream produced by said fan to flow forward in the vehicle and provide a reverse thrust to the hull; and (g) flap urging means for urging the flap means to said normal position, and for allowing said flap means to move to the open position thereof when the air pressure increase in the air duct is effected upon the rudders assuming said closed arrangement.

2. The propulsion air stream deflecting apparatus as recited in claim 1, wherein said opening means of the air duct includes a pair of openings extending through the duct at locations horizontally opposed to each other, and said flap means includes a pair of flaps pivotally mounted on the air duct over said openings, respectively, about respective vertical axes.

3. The propulsion air stream deflecting apparatus as recited in claim 2, wherein said air duct is in the shape of a hollow cylinder, the apparatus has only two said rudders, and each of the rudders has a substantially semicircular shape defining an arcuate edge and a chord edge contiguous to the arcuate edge, the chord edge of each of said rudders extending parallel to the vertical axis about which the rudder is pivotally supported.

4. The propulsion air stream deflecting apparatus as recited in claim 2, wherein the flap urging means comprises springs for respectively urging said flaps to close the openings extending through said air duct.

5. The propulsion air stream deflecting apparatus as recited in claim 1, wherein the opening means extends through a top portion of said air duct, and said flap means is pivotally mounted on the air duct about a horizontal axis.

6. The propulsion air stream deflecting apparatus as recited in claim 5, wherein the air duct is in the shape of a hollow cylinder, the apparatus has only two said rudders, and each of the rudders has a substantially semicircular shape defining an arcuate edge and a chord edge contiguous to the arcuate edge, the chord edge of each of said rudders extending parallel to the vertical axis about which the rudder is pivotally supported.

7. The propulsion air stream deflecting apparatus as recited in claim 5, wherein the flap urging means comprises a spring for urging the flap means to close the opening means of the air duct.

8. The propulsion air stream deflecting apparatus as recited in claim 5, further comprising a lift air stream duct communicating at one end thereof with the air duct downstream of the propeller fan, with respect to the direction of air propelled by said fan, and having another end directed generally downward in the vehicle for guiding part of the air stream produced by said fan in the air duct therethrough to provide a lift thrust to the air cushion vehicle.

* * * * *